United States Patent
Yokozawa

(10) Patent No.: US 9,747,061 B2
(45) Date of Patent: Aug. 29, 2017

(54) RECORDING MEDIUM THAT STORES PRINTING PROGRAM FOR INSTRUCTING IMAGE FORMING APPARATUS OF PRINT JOB BASED ON VARIABLE PRINT DATA

(71) Applicant: Kyocera Document Solutions Inc., Osaka (JP)

(72) Inventor: Yuki Yokozawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/857,850

(22) Filed: Sep. 18, 2015

(65) Prior Publication Data
US 2016/0085486 A1   Mar. 24, 2016

(30) Foreign Application Priority Data
Sep. 18, 2014   (JP) ................. 2014-189600

(51) Int. Cl.
*G06F 15/00* (2006.01)
*G06F 3/12* (2006.01)
*G06K 15/02* (2006.01)
*G06K 15/00* (2006.01)

(52) U.S. Cl.
CPC .......... *G06F 3/1212* (2013.01); *G06F 3/1243* (2013.01); *G06K 15/1817* (2013.01); *G06K 15/402* (2013.01)

(58) Field of Classification Search
CPC ..... G06F 3/1212; G06F 3/1243; G06F 3/1296
USPC ....................................... 358/1.13
See application file for complete search history.

(56) References Cited

U.S. PATENT DOCUMENTS

2015/0070721 A1* 3/2015 Mihira ................. G06F 3/1229
358/1.14

FOREIGN PATENT DOCUMENTS

| JP | 2012-137854 A | 7/2012 |
| JP | 2013-101495 A | 5/2013 |
| JP | 2013-132038 A | 7/2013 |

OTHER PUBLICATIONS

Machine translation of Japanese Patent Document No. 2013-132038, Jul. 4, 2013, Orikasa.*
Machine translation of Japanese Patent Document No. 2012-137854, Jul. 19, 2012, Yamamuro.*

* cited by examiner

*Primary Examiner* — Mark Milia
(74) *Attorney, Agent, or Firm* — James Judge

(57) ABSTRACT

A non-transitory computer-readable recording medium stores a printing program for executing on a computer. The printing program causes the computer to function as an available capacity determining circuit and a print data transmitting circuit. The available capacity determining circuit determines an available capacity available for a print job in a storage device of the image forming apparatus. The print data transmitting circuit transmits print data to the image forming apparatus, the print data being adapted to the available capacity determined by the available capacity determining circuit. The print data transmitting circuit converts the variable print data into print data without the reuse data and transmits the converted print data to the image forming apparatus in a specific case where the available capacity is less than the variable printing capacity.

3 Claims, 11 Drawing Sheets

RECORDING MEDIUM THAT STORES PRINTING PROGRAM FOR INSTRUCTING IMAGE FORMING APPARATUS OF PRINT JOB BASED ON VARIABLE PRINT DATA

INCORPORATION BY REFERENCE

This application is based upon, and claims the benefit of priority from, corresponding Japanese Patent Application No. 2014-189600 filed in the Japan Patent Office on Sep. 18, 2014, the entire contents of which are incorporated herein by reference.

BACKGROUND

Unless otherwise indicated herein, the description in this section is not prior art to the claims in this application and is not admitted to be prior art by inclusion in this section.

There is known an image forming apparatus that performs a raster image processor (RIP) process on reuse data of variable print data including the reuse data, which is a common part of a plurality of printed matters, and variable data, which is a variable part of the respective printed matters, to store in the storage device, and that in generating the respective printed matters executes variable printing that generates an image of the respective printed matters with the superimposed RIP-processed reuse data, which is stored in the storage device, on the variable data, to which the RIP-process was performed in generating the respective printed matters. An image forming apparatus includes a main storage device and an auxiliary storage device with a lower access speed than the main storage device as a storage device. Then, the image forming apparatus stores the RIP-processed reuse data in the auxiliary storage device when the RIP-processed reuse data has a size larger than the free space of the main storage device.

SUMMARY

A non-transitory computer-readable recording medium according to one aspect of the disclosure stores a printing program for executing on a computer. The computer instructs an image forming apparatus of a print job based on variable print data including reuse data and variable data. The reuse data is a common part of a plurality of printed matters. The variable data is a variable part of the respective printed matters. The printing program causes the computer to function as an available capacity determining circuit and a print data transmitting circuit. The available capacity determining circuit determines an available capacity available for a print job in a storage device of the image forming apparatus. The print data transmitting circuit transmits print data to the image forming apparatus, the print data being adapted to the available capacity determined by the available capacity determining circuit. The print data transmitting circuit transmits the variable print data to the image forming apparatus when the available capacity is equal to or more than a variable printing capacity executable of a variable printing for the image forming apparatus. The print data transmitting circuit converts the variable print data into print data without the reuse data and transmits the converted print data to the image forming apparatus in a specific case where the available capacity is less than the variable printing capacity.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
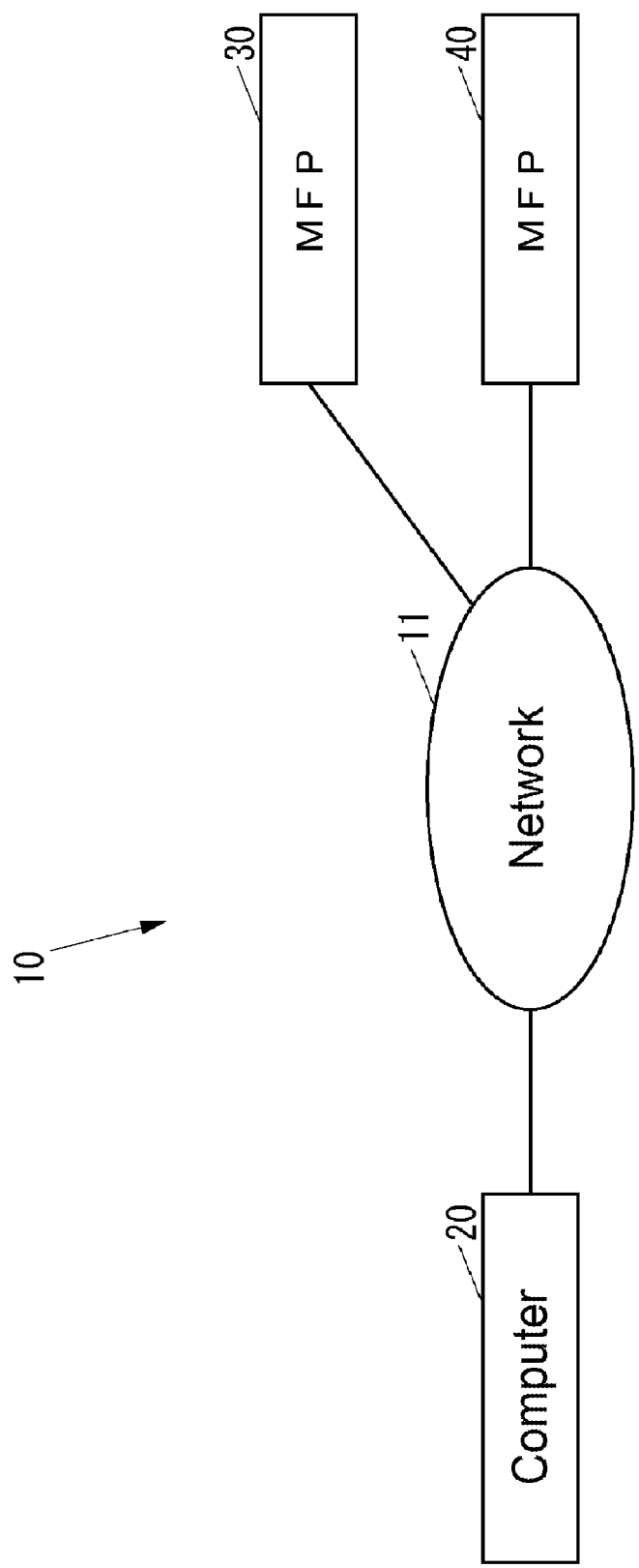
FIG. 1 illustrates a print system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a description will be given of a configuration of a print system according to the embodiment.

FIG. 1 is a block diagram illustrating a print system 10 according to the embodiment.

As illustrated in FIG. 1, the print system 10 includes a computer 20 and a plurality of multifunction peripherals (MFP). The computer 20 instructs a print job to an image forming apparatus based on variable data printing (variable printing) data. The plurality of MFPs is such as an MFP 30 and an MFP 40 as the image forming apparatus that can interpret the variable print data. The computer 20 and the MFP are connected in a communicable manner with each other via a network 11 such as a local area network (LAN) and the Internet.

Figure 2:
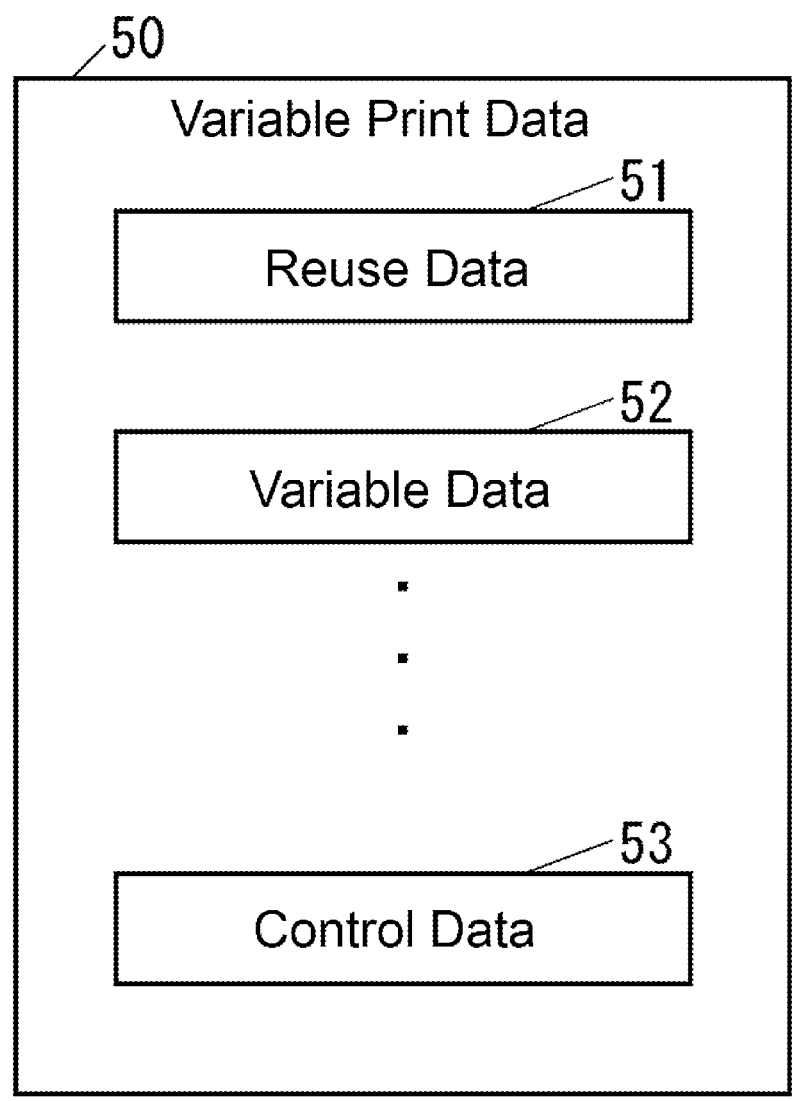
FIG. 2 illustrates variable print data handled in the print system according to the one embodiment.

FIG. 2 illustrates variable print data 50 handled in the print system 10.

As illustrated in FIG. 2, the variable print data 50 includes reuse data 51, which is a common part of a plurality of printed matters, and variable data 52, which is a variable part of the respective printed matters. The variable print data 50 includes control data 53 that defines how to superimpose reuse data on which a raster image processor (RIP) process is performed (hereinafter referred to as "reuse bitmap data") on variable data on which the RIP process is performed (hereinafter referred to as "variable bitmap data"). For example, common data of Personalized Print Markup Language (PPML), which is a representative data format of the variable printing, is constituted of the reuse data 51, the variable data 52, and the control data 53, which are compressed as print data in ZIP format. As the reuse data 51 and the variable data 52, Page Description Language (PDL) data, such as a Postscript and a Portable Document Format (PDF), is employed.

The variable printing is a printing technique that performs the RIP process on the reuse data 51 to store in the storage device, and superimposes the RIP-processed reuse data stored in the storage device, namely the reuse bitmap data, on the variable data 52 on which the RIP process is performed in generating the respective printed matters, namely the variable bitmap data, in generating the respective printed matters to generate an image of the respective printed matters. This ensures the variable printing to reduce the time necessary for the RIP process to the reuse data 51 in the whole process of generating a plurality of printed matters. For example, the variable printing is effective to the printed matters such as direct mails replacing a part of information such as destinations.

Figure 3:
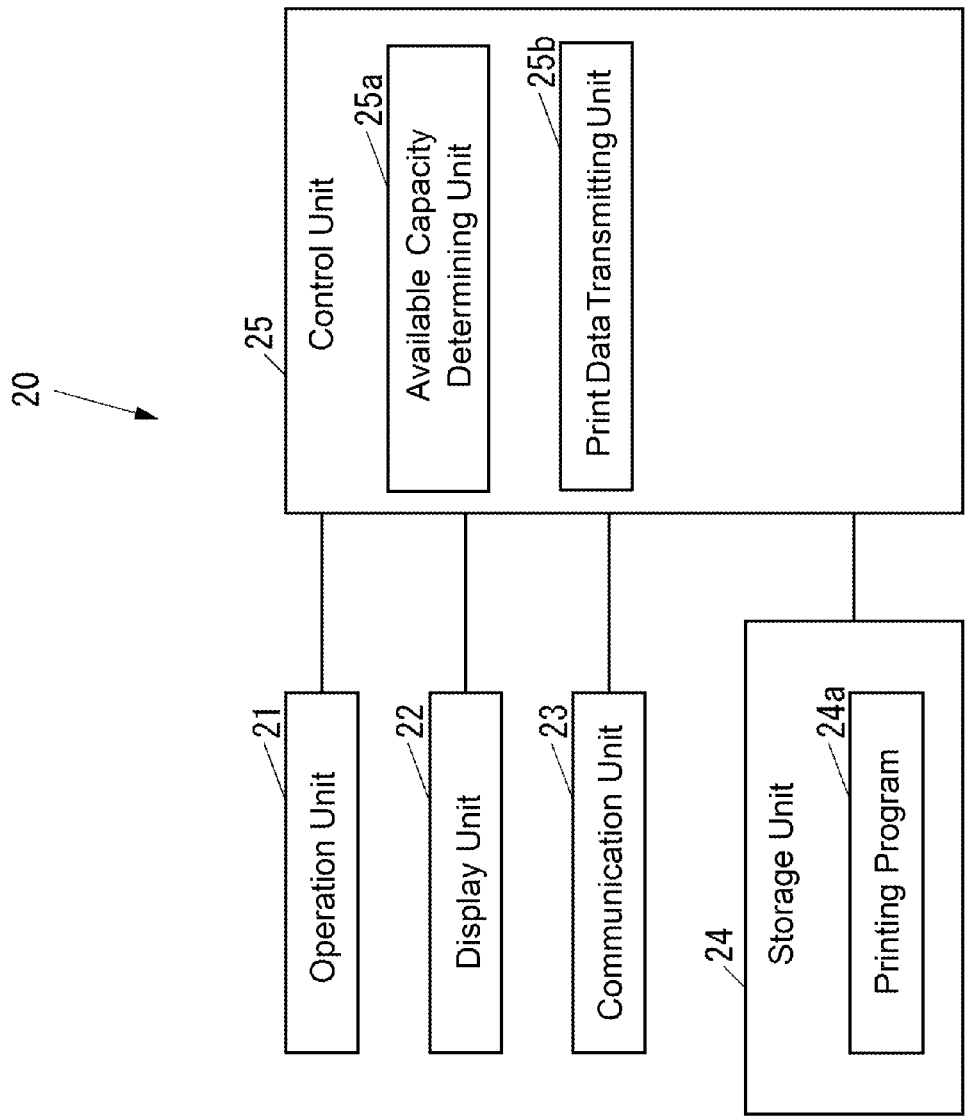
FIG. 3 illustrates a computer according to the one embodiment.

FIG. 3 is a block diagram illustrating the computer 20.

As illustrated in FIG. 3, the computer 20 includes an operation unit 21, a display unit 22, a communication unit 23, a storage unit 24, and a control unit 25. The operation unit 21 is an input device such as a computer mouse and a keyboard to which various operations are input. The display unit 22 is a display device such as a liquid crystal display (LCD) that displays various information. The communication unit 23 is a communication device for communications with an external device such as an MFP via the network 11 (see FIG. 1). The storage unit 24 is a storage device such as a hard disk drive (HDD) that stores a program and various data. The control unit 25 is a control device that controls the entire computer 20. The computer 20 is configured by an electronic device, for example, a personal computer (PC), a mobile device, and similar device.

The storage unit 24 stores a printing program 24a for controlling an MFP. The printing program 24a may be installed in the computer 20 at production stage of the computer 20, may be additionally installed in the computer 20 from a storage medium such as a compact disk (CD), a digital versatile disk (DVD), and a universal serial bus (USB) memory, or may be additionally installed in the computer 20 via the network 11.

The control unit 25 includes, for example, a central processing unit (CPU), a read only memory (ROM), which preliminary stores a program and various data, and a random access memory (RAM), which is employed as a work area for the CPU.

The CPU runs a program stored in the ROM or the storage unit 24.

The control unit 25 runs the printing program 24a stored in the storage unit 24 to function as an available capacity determining unit 25a (which is also referred to as available capacity determining circuit), which determines an available capacity as the capacity available for a print job in the storage device of the MFP, and a print data transmitting unit 25b (which is also referred to as print data transmitting circuit), which transmits print data adapted to the available capacity determined by the available capacity determining unit 25a to the MFP.

Figure 4:
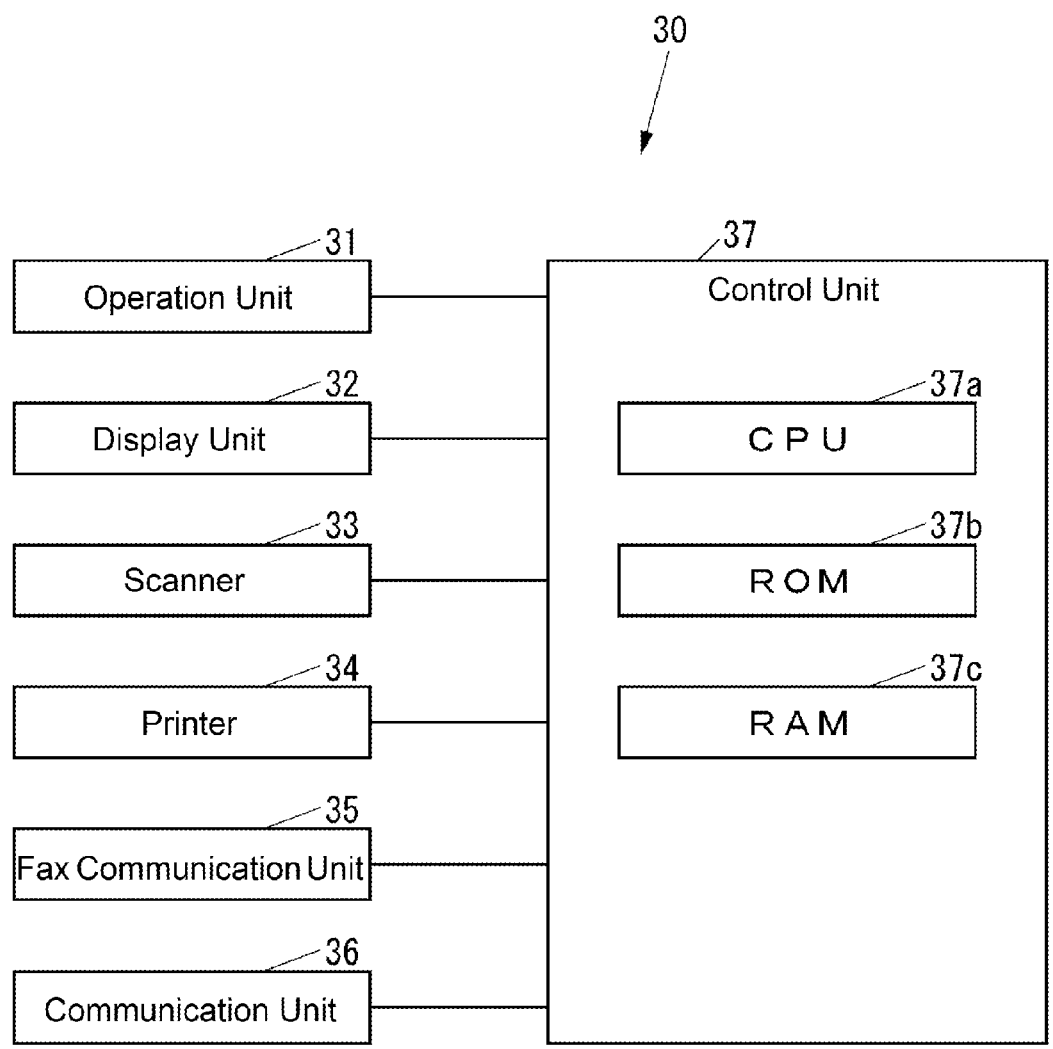
FIG. 4 illustrates an MFP according to the one embodiment.

FIG. 4 is a block diagram illustrating the MFP 30.

As illustrated in FIG. 4, the MFP 30 includes an operation unit 31, a display unit 32, a scanner 33, a printer 34, a fax communication unit 35, a communication unit 36, and a control unit 37. The operation unit 31 is an input device such as a button to which various operations are input. The display unit 32 is a display device such as a LCD that displays various information. The scanner 33 is a reading device for reading an image from an original document. The printer 34 is a print device for running a print job on a recording medium such as a paper sheet. The fax communication unit 35 is a fax device that performs fax communication with an external facsimile device (not illustrated) via a communication line such as a dial-up line. The communication unit 36 is a communication device that communicates with an external device such as the computer 20 (see FIG. 1) via the network 11 (see FIG. 1). The control unit 37 is a control device that controls the entire MFP 30.

The control unit 37 includes, for example, a CPU 37a, a ROM 37b, which stores a program and various data, and a RAM 37c as a main storage device, which is employed as a work area for the CPU 37a. The CPU 37a runs a program stored in the ROM 37b.

Figure 5:
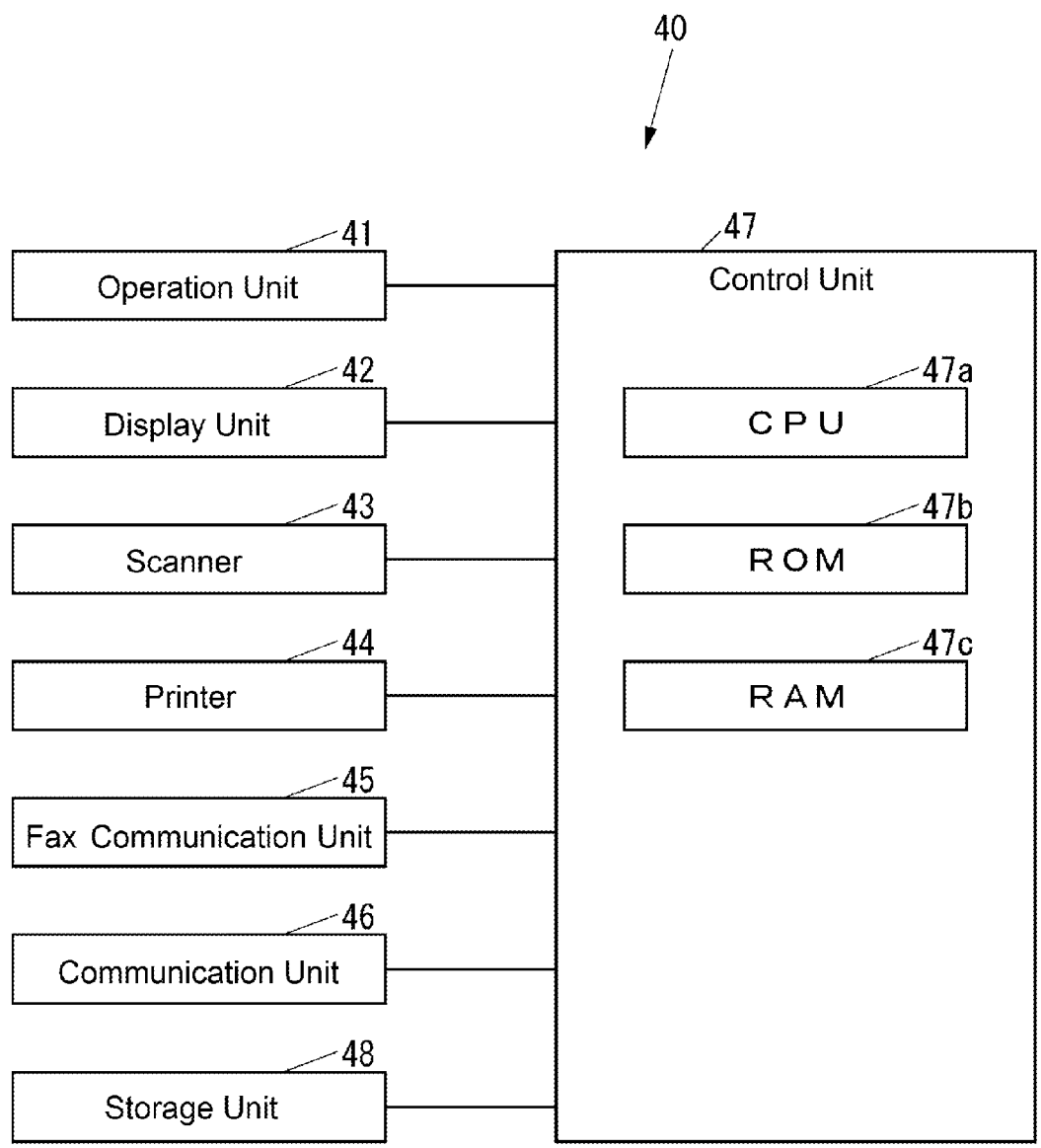
FIG. 5 illustrates an MFP that is according to the one embodiment but is different from the MFP illustrated in FIG. 4.

FIG. 5 is a block diagram illustrating the MFP 40.

As illustrated in FIG. 5, the MFP 40 includes, as well as the MFP 30 illustrated in FIG. 4, an operation unit 41, a display unit 42, a scanner 43, a printer 44, a fax communication unit 45, a communication unit 46, and a control unit 47 including a CPU 47a, a ROM 47b, and a RAM 47c.

The MFP 40 also includes a storage unit 48 that is a storage device such as an electrically erasable programmable read only memory (EEPROM) and an HDD storing various data. The storage unit 48 is an auxiliary storage device with a lower access speed than the RAM 47c as a main storage device. The storage unit 48 may be a built-in storage device such as an HDD, or may be a removable storage device such as a USB flash drive.

Next, a description will be given of a performance of the computer 20.

Figure 6A:
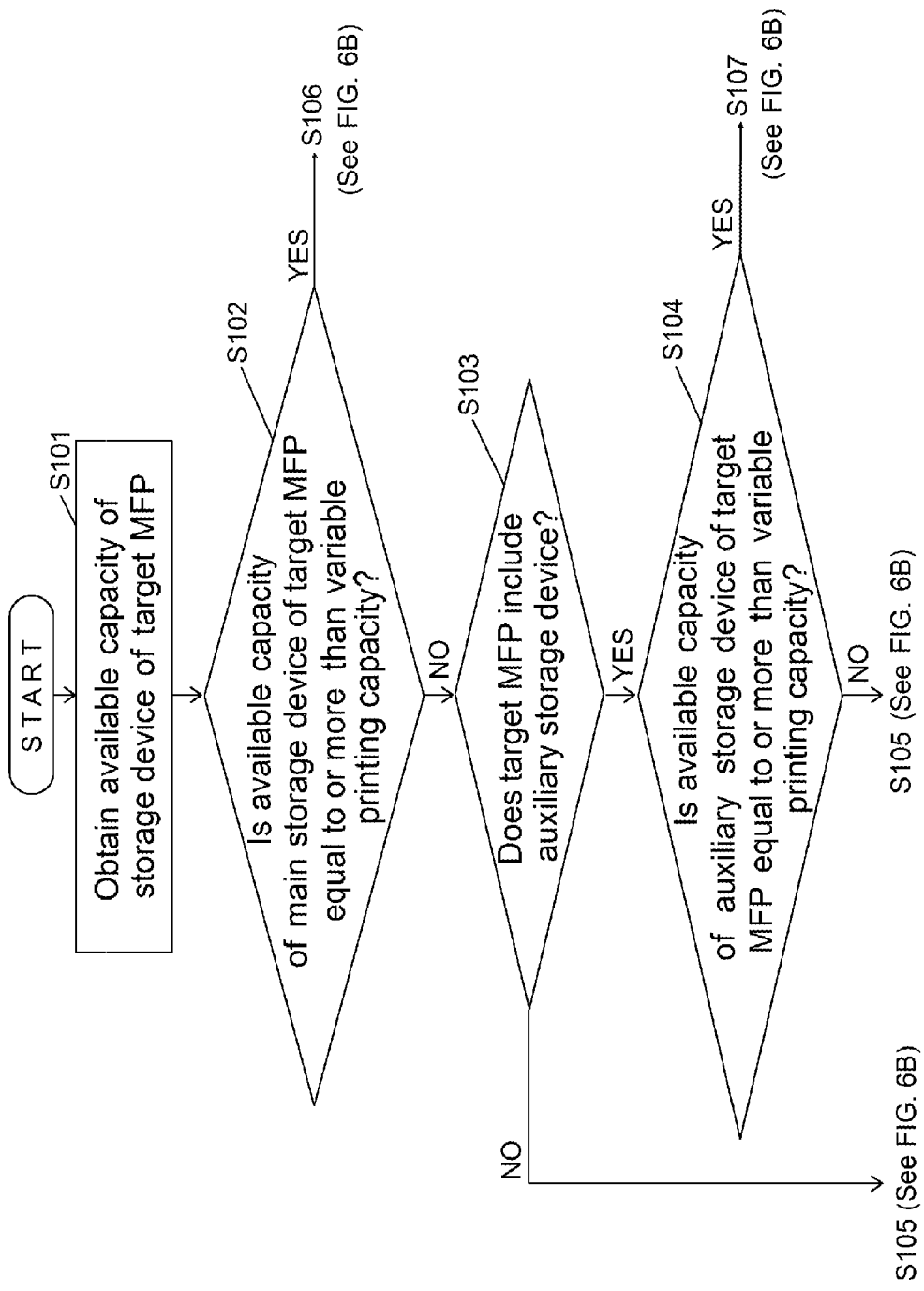
FIGS. 6A and 6B illustrate a performance of the computer according to the one embodiment when instructing a print job to the MFP based on variable print data.
Figure 6B:
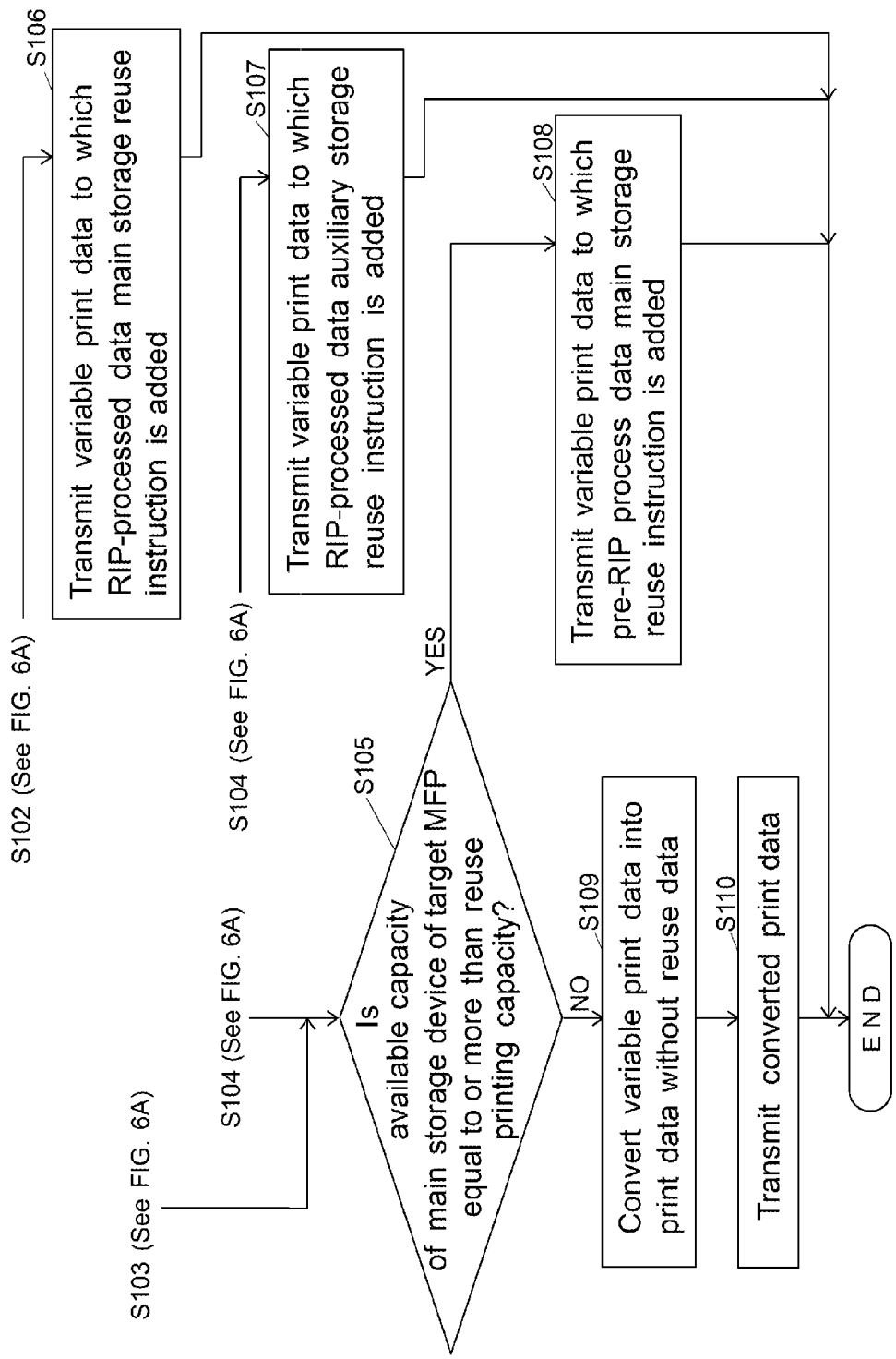

When the computer 20 instructs an MFP of a print job based on the variable print data 50, the computer 20 runs a performance indicated in FIGS. 6A and 6B.

FIGS. 6A and 6B are a flowchart of the performance of the computer 20 when instructing an MFP of a print job based on the variable print data 50.

As illustrated in FIG. 6A, the available capacity determining unit 25a of the computer 20 obtains an available capacity of the storage device of the MFP that is a target to instruct a print job (hereinafter referred to as "target MFP") via the communication unit 23 from the target MFP (Step S101). Here, the available capacity determining unit 25a obtains an available capacity of the main storage device of the target MFP and information whether or not the target MFP includes an auxiliary storage device. When the target MFP includes the auxiliary storage device, the available capacity determining unit 25a also obtains the available capacity of the auxiliary storage device of the target MFP. The target MFP may notify the computer 20 of, for example, a free space of the storage device as the available capacity of the storage device.

Next, the available capacity determining unit 25a determines whether or not "the available capacity of the main storage device of the target MFP" obtained at Step S101 is equal to or more than a variable printing capacity as an executable capacity of the variable printing for the MFP (Step S102). Here, the variable printing capacity is a predetermined capacity as a minimum capacity necessary for storing the RIP-processed reuse data, namely, the reuse bitmap data.

When the available capacity determining unit 25a determines that the available capacity of the main storage device of the target MFP is not equal to or more than the variable printing capacity, namely, less than the variable printing capacity, at Step S102, the available capacity determining unit 25a determines whether or not the information that the target MFP includes the auxiliary storage device is obtained at Step S101 (Step S103).

When the available capacity determining unit 25a determines that the information that the target MFP includes the auxiliary storage device is obtained at Step S103, the available capacity determining unit 25a determines whether or not "the available capacity of the auxiliary storage device of the target MFP" obtained at Step S101 is equal to or more than the variable printing capacity (Step S104).

When the available capacity determining unit 25a determines that the information that the target MFP includes the auxiliary storage device is not obtained at Step S103, or determines that the available capacity of the auxiliary storage device of the target MFP is not equal to or more than the variable printing capacity, namely, less than the variable printing capacity, at Step S104, the available capacity determining unit 25a determines whether or not "the available capacity of the main storage device of the target MFP" obtained at Step S101 is equal to or more than the reuse printing capacity as an executable capacity of a print job while the MFP stores the reuse data 51 of pre-RIP process (Step S105). Here, the reuse printing capacity is a predetermined capacity as a minimum capacity necessary for executing a print job while the MFP stores the reuse data 51 of pre-RIP process. The size of the reuse data 51 of pre-RIP process is smaller than the size of the RIP-processed reuse data, namely, the size of the reuse bitmap data. Then, the reuse printing capacity is smaller than the variable printing capacity.

When the available capacity of the main storage device of the target MFP is determined to be equal to or more than the variable printing capacity at Step S102, the print data transmitting unit 25b transmits the variable print data 50, to which an instruction to store the RIP-processed reuse data, namely, the reuse bitmap data in the main storage device and to reuse the reuse bitmap data stored in the main storage device in generating the respective printed matters (hereinafter referred to as "RIP-processed data main storage reuse instruction") is added, to the target MFP via the communication unit 23 (Step S106).

Figure 7:
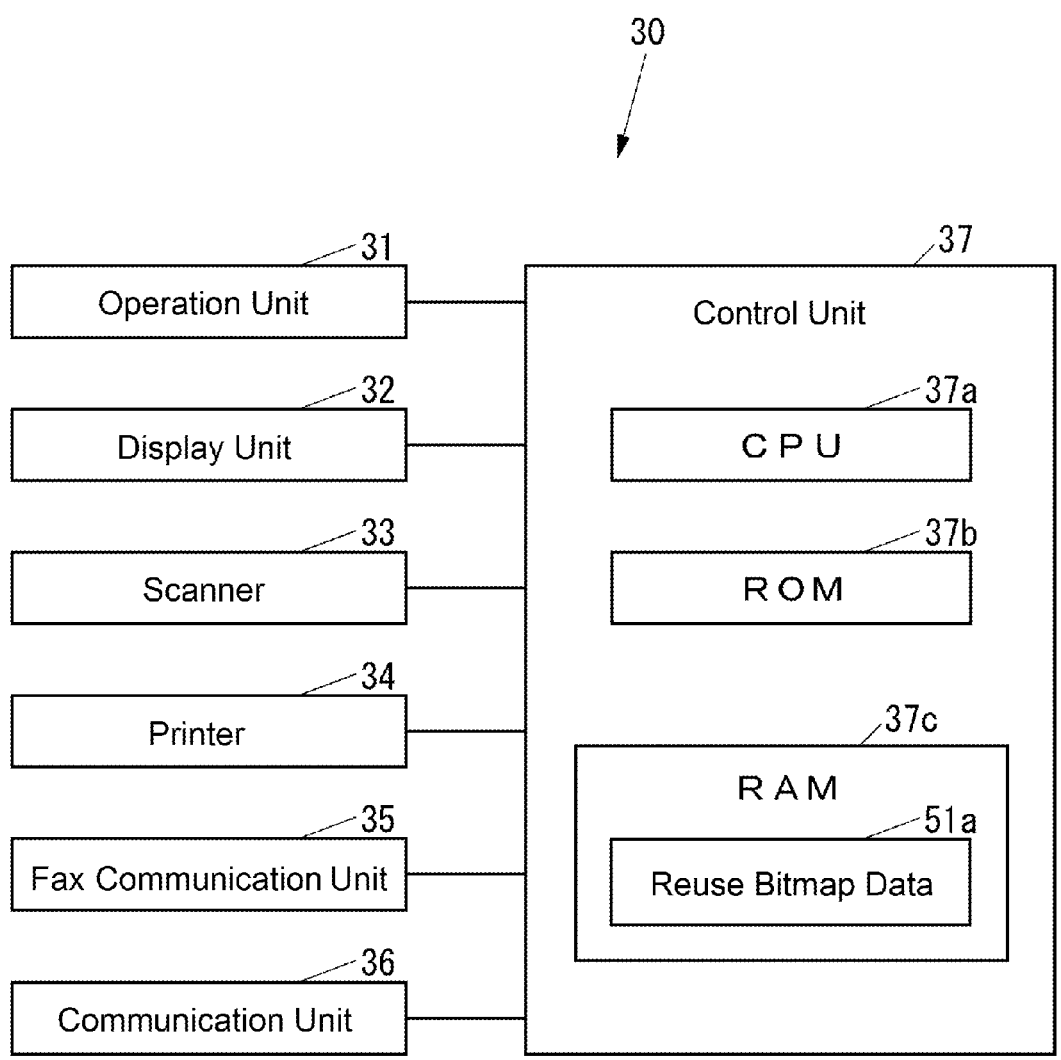
FIG. 7 illustrates the MFP according to the one embodiment in a state where RIP-processed reuse data is stored in a RAM.

Accordingly, for example, when the target MFP is the MFP 30, after the control unit 37 of the MFP 30 receives the variable print data 50, to which the RIP-processed data main storage reuse instruction is added, from the computer 20 via the communication unit 36, the control unit 37 of the MFP 30 performs the RIP process on the reuse data 51 among the received variable print data 50 to store the RIP-processed reuse data, namely, reuse bitmap data 51a in the RAM 37c as the main storage device as illustrated in FIG. 7. Then, the control unit 37 superimposes the reuse bitmap data 51a, which is stored in the RAM 37c, on the variable data, which is performed the RIP process in generating the respective printed matters, namely, the variable bitmap data in generating the respective printed matters to generate an image of the respective printed matters. Namely, the target MFP executes the variable printing that stores the reuse bitmap data 51a in the main storage device (hereinafter referred to as "reuse data main storage variable printing").

As illustrated in FIG. 6A, when the available capacity of the auxiliary storage device of the target MFP is determined to be equal to or more than the variable printing capacity at Step S104, the print data transmitting unit 25b transmits the variable print data 50, to which an instruction to store the RIP-processed reuse data, namely, the reuse bitmap data in the auxiliary storage device and to reuse the reuse bitmap data stored in the auxiliary storage device in generating the respective printed matters (hereinafter referred to as "RIP-processed data auxiliary storage reuse instruction") is added, to the target MFP via the communication unit 23 (Step S107).

Figure 8:
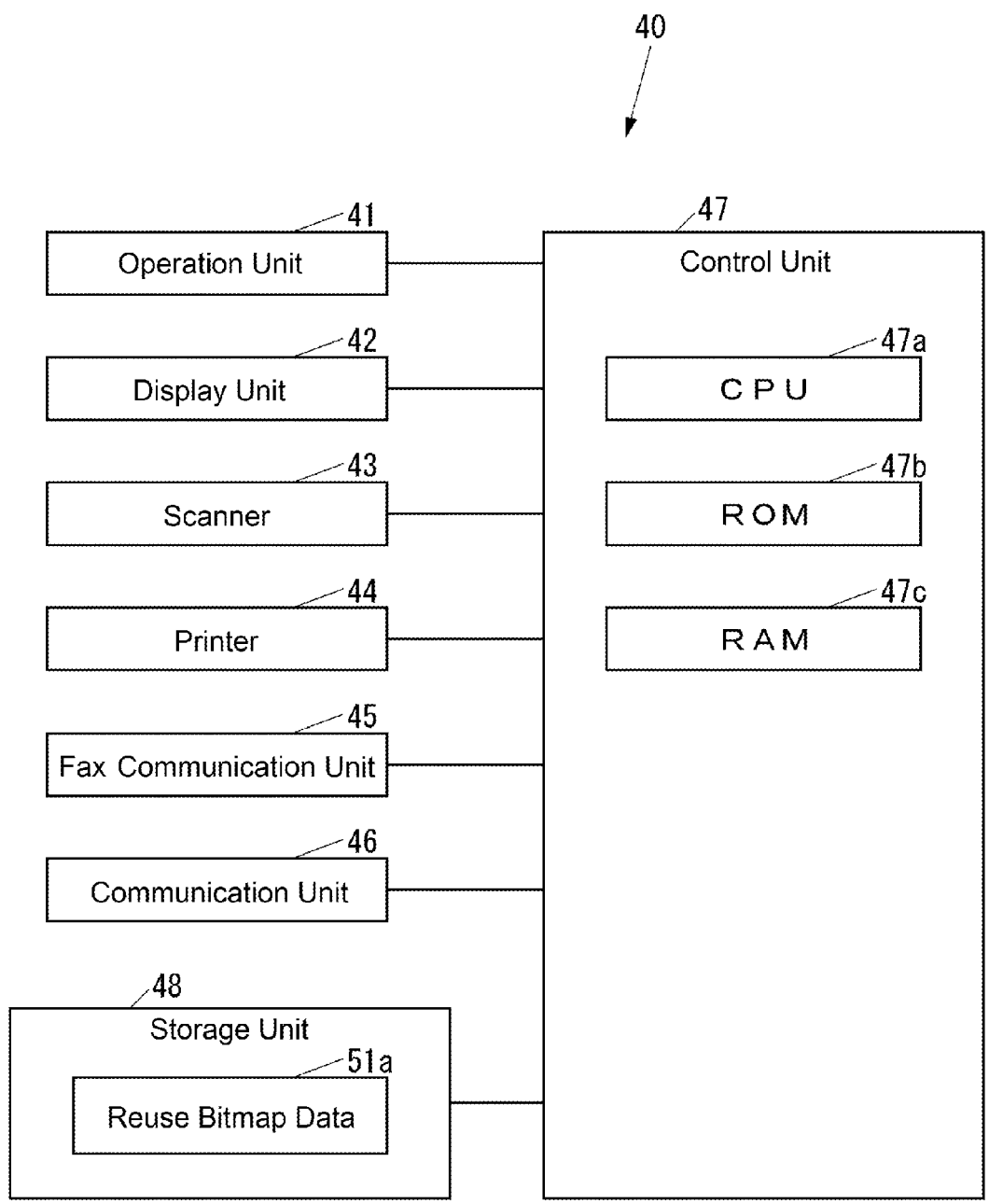
FIG. 8 illustrates the MFP according to the one embodiment in a state where the RIP-processed reuse data is stored in a storage unit.

Accordingly, for example, when the target MFP is the MFP 40, after the control unit 47 of the MFP 40 receives the variable print data 50, to which the RIP-processed data auxiliary storage reuse instruction is added, from the computer 20 via the communication unit 46, the control unit 47 of the MFP 40 performs the RIP process on the reuse data 51 among the received variable print data 50 to store the RIP-processed reuse data, namely, the reuse bitmap data 51a in the storage unit 48 as the auxiliary storage device as illustrated in FIG. 8. Then, the control unit 47 superimposes the reuse bitmap data 51a, which is stored in the storage unit 48, on the variable data, which is performed the RIP process in generating the respective printed matters, namely, the variable bitmap data in generating the respective printed matters to generate an image of the respective printed matters. Namely, the target MFP executes the variable printing that stores the reuse bitmap data 51a in the auxiliary storage device (hereinafter referred to as "reuse data auxiliary storage variable printing").

The auxiliary storage device has a lower access speed than the main storage device. Then, the reuse data auxiliary storage variable printing has a lower execution speed compared with the reuse data main storage variable printing. However, the reuse data auxiliary storage variable printing does not store the reuse bitmap data 51a in the main storage device of the MFP. Then, the reuse data auxiliary storage variable printing can reduce pressing the main storage device capacity of the MFP compared with the reuse data main storage variable printing.

As illustrated in FIG. 6B, when the available capacity of the main storage device of the target MFP is determined to be equal to or more than the reuse printing capacity at Step S105, the print data transmitting unit 25b transmits the variable print data 50, to which an instruction to store the reuse data 51 of pre-RIP process in the main storage device and to reuse the reuse data 51 of pre-RIP process stored in the main storage device in generating the respective printed matters (hereinafter referred to as "pre-RIP process data main storage reuse instruction") is added, to the target MFP via the communication unit 23 (Step S108). The print data transmitting unit 25b simply transmits the reuse data 51, the variable data 52 and the control data 53, which are included in the variable print data 50, at the process of Step S108. Then, the print data transmitting unit 25b may be configured to transmit print data in a format other than variable print data including the reuse data 51, the variable data 52 and the control data 53, which are included in the variable print data 50, instead of transmitting the variable print data 50 itself.

Figure 9:
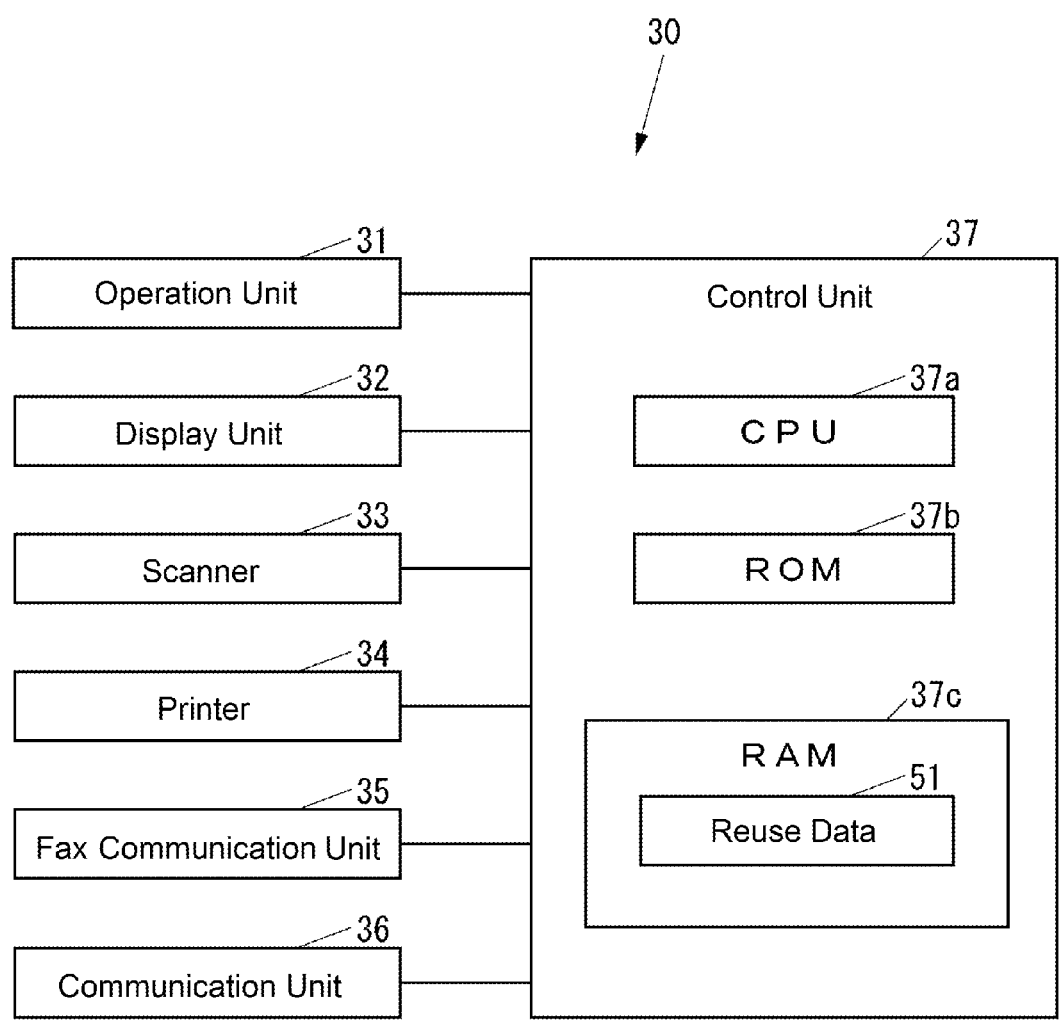
FIG. 9 illustrates the MFP according to the one embodiment in a state where the reuse data of pre-RIP process is stored in the RAM.

Accordingly, for example, when the target MFP is the MFP 30, after the control unit 37 of the MFP 30 receives the variable print data 50, to which the pre-RIP process data main storage reuse instruction is added, from the computer 20 via the communication unit 36, the control unit 37 of the MFP 30 stores the reuse data 51 among the received variable print data 50 in the RAM 37c as the main storage device as illustrated in FIG. 9. Then, the control unit 37 superimposes the reuse data 51 of pre-RIP process stored in the RAM 37c on the variable data 52 after performing the RIP process in generating the respective printed matters to generate an image of the respective printed matters.

A print job that stores the reuse data 51 of pre-RIP process in the storage device of the MFP to reuse in generating the respective printed matters (hereinafter referred to as "pre-RIP process reuse data storage printing") should perform the RIP process on the reuse data 51 every time when generating the respective printed matters. Then, the pre-RIP process reuse data storage printing has a lower execution speed compared with the reuse data main storage variable printing and the reuse data auxiliary storage variable printing. However, the pre-RIP process reuse data storage printing simply stores the RIP-processed reuse data, namely, the reuse data 51 of which the size is smaller than the reuse bitmap data 51a in the storage device of the MFP. Then, the pre-RIP process reuse data storage printing can reduce pressing the storage device capacity of the MFP compared with the reuse data main storage variable printing and the reuse data auxiliary storage variable printing.

Figure 10:
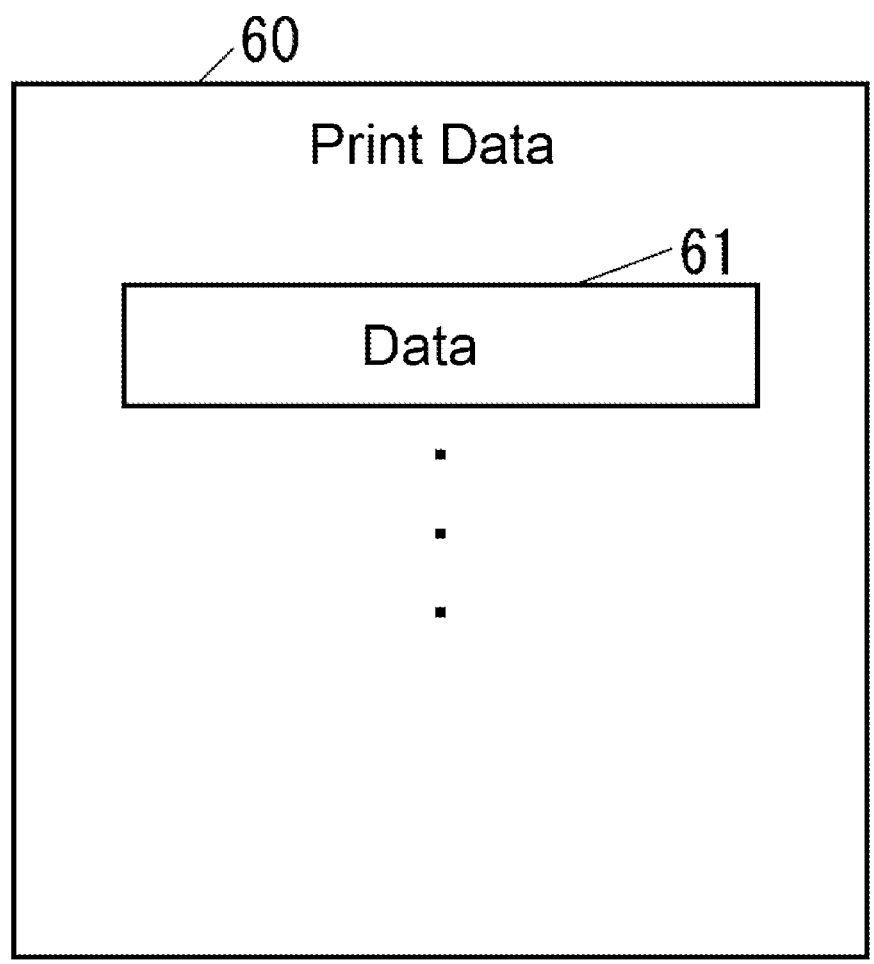
FIG. 10 illustrates print data handled in a print system according to the one embodiment.

As illustrated in FIG. 6B, when the available capacity of the main storage device of the target MFP is determined not to be equal to or more than the reuse printing capacity, namely, to be less than the reuse printing capacity at Step S105, the print data transmitting unit 25b, as illustrated in FIG. 10, converts the variable print data 50 into ordinary print data 60 without the reuse data 51 (see FIG. 2, Step S109). As illustrated in FIG. 10, the print data 60 is constituted of data 61 of the respective printed matters.

As illustrated in FIG. 6B, after the process at Step S109, the print data transmitting unit 25b transmits the print data 60 converted at Step S109 to the target MFP (Step S110).

Accordingly, for example, when the target MFP is the MFP 30, after the control unit 37 of the MFP 30 receives the print data 60 from the computer 20 via the communication unit 36, the control unit 37 performs the RIP process on the data 61 of the received print data 60 in generating the respective printed matters to generate an image of the respective printed matters.

In a print job based on the ordinary print data 60 (hereinafter referred to as "ordinary printing"), the size of the print data 60 transmitted from the computer 20 to the MFP is possibly larger than the size of the variable print data 50. Then, comparing with the reuse data main storage variable printing, the reuse data auxiliary storage variable printing, and the pre-RIP process reuse data storage printing, the execution speed of the ordinary printing may be slower because of such as increasing of time for transmitting and receiving print data between the computer 20 and the MFP. However, the ordinary printing should not store data for reuse in the storage device of the MFP. Then, comparing with the reuse data main storage variable printing, the reuse data auxiliary storage variable printing, and the pre-RIP process reuse data storage printing, the ordinary printing can reduce pressing the storage device capacity of the MFP.

After the processes at Step S106, S107, S108, or S110 are terminated, the print data transmitting unit 25b terminates the performance indicated in FIG. 6B.

As described above, when the MFP cannot execute the variable printing because of the shortage of the storage device capacity (NO at Step S102, and NO at Step S103 or NO at Step S104), the computer 20 converts the variable print data 50 into the print data 60 without the reuse data 51 (Step S109), and transmits the converted print data 60 to the MFP (Step S110). When the MFP cannot execute the variable printing because of the shortage of the storage device capacity, the computer 20 transmits the variable print data 50, to which the pre-RIP process data main storage reuse instruction is added, to the MFP (Step S108).

Accordingly, even if the MFP cannot execute the variable printing because of the shortage of the storage device capacity, the computer 20 can instruct the MFP of the print job based on the variable print data 50. Namely, regardless of the performance of the MFP, the computer 20 can cause the MFP to execute the print job based on the variable print data 50.

When the variable printing capacity is set with sufficient margin, even if the MFP can execute the variable printing with the available capacity of the storage device of the MFP, the computer 20 does not cause the MFP to execute the variable printing, which stores the RIP-processed reuse data, namely, the reuse bitmap data 51a in the storage device of the MFP insofar as the available capacity of the storage device of the MFP is less than the variable printing capacity. Accordingly, the computer 20 can reduce to cause the deterioration in the print job performance because of pressing the storage device capacity of the MFP by the reuse bitmap data 51a.

Even if the MFP cannot execute the variable printing because of the shortage of the storage device capacity (NO at Step S102, and NO at Step S103 or NO at Step S104), when the MFP can execute the print job with storing the reuse data 51 of pre-RIP process (YES at Step S105), the computer 20 transmits the variable print data 50 to the MFP along with the pre-RIP process data main storage reuse instruction (Step S108). Then, comparing with the case where the MFP cannot execute the print job with storing the reuse data 51 of pre-RIP process because of the shortage of the storage device capacity (NO at Step S105), the period from the beginning of the instruction of the print job to the MFP to the termination of the print job in the MFP can be reduced.

When the MFP cannot execute the variable printing because of the shortage of the storage device capacity, the computer 20 may always transmit the print data 60 converted from the variable print data 50 to the MFP without transmitting the variable print data 50, to which the pre-RIP process data main storage reuse instruction is added, to the MFP. When the MFP cannot execute the variable printing because of the shortage of the storage device capacity, the computer 20 may always transmit the variable print data 50, to which the pre-RIP process data main storage reuse instruction is added, to the MFP without transmitting the print data 60 converted from the variable print data 50 to the MFP.

The computer 20 causes the MFP to use the main storage device such as the RAM 47c, which has a higher access speed than the auxiliary storage device such as the storage unit 48, preferentially in the variable printing (Step S102, S106 and S107). Then, the computer 20 can realize the print job execution with higher speed. When the available capacity of the storage device of the MFP is equal to or more than the variable printing capacity, the computer 20 may transmit the variable print data 50, to which the instruction to store the RIP-processed reuse data, namely, the reuse bitmap data 51a in the storage device and to reuse the reuse bitmap data 51a stored in the storage device in generating the respective printed matters is added, to the MFP without the distinction of the main storage device and the auxiliary storage device.

According to the embodiment, when the available capacity of the main storage device of the MFP is less than the reuse printing capacity (NO at Step S105), the computer 20 converts the variable print data 50 into the print data 60 without the reuse data 51 (Step S109) and transmits the converted print data 60 to the MFP (Step S110). However, when the available capacity of the main storage device of the MFP is less than the reuse printing capacity (NO at Step S105), if the available capacity of the auxiliary storage device of the MFP is equal to or more than the reuse printing capacity, the computer 20 may transmit the variable print data 50, to which the instruction to store the reuse data 51 of pre-RIP process in the auxiliary storage device and to reuse the reuse data 51 of pre-RIP process stored in the auxiliary storage device in generating the respective printed matters is added, to the MFP. In this case, the computer 20 simply transmits the reuse data 51, the variable data 52, and the control data 53, which are included in the variable print data 50. Then, the computer 20 may transmit print data in the format other than variable print data including the reuse data 51, the variable data 52, and the control data 53, which are included in the variable print data 50, instead of transmitting the variable print data 50 itself.

When the available capacity of the storage device of the MFP is equal to or more than the reuse printing capacity, the computer 20 may transmit the variable print data 50, to which the instruction to store the reuse data 51 of pre-RIP process in the storage device and to reuse the reuse data 51 of pre-RIP process stored in the storage device in generating the respective printed matters is added, to the MFP without the distinction of the main storage device and the auxiliary storage device. In this case, the computer 20 simply transmits the reuse data 51, the variable data 52, and the control data 53, which are included in the variable print data 50. Then, the computer 20 may transmit print data in the format other than variable print data including the reuse data 51, the variable data 52, and the control data 53, which are included in the variable print data 50, instead of transmitting the variable print data 50 itself.

The computer 20 obtains the available capacity of the storage device of the MFP from the MFP (Step S101). Then, the computer 20 can transmit print data adapted to the actual condition of the MFP to the MFP. The available capacity of the storage device of the MFP may be set in the computer 20 by, for example, a user in advance.

While the image forming apparatus of the disclosure is an MFP according to the embodiment, the image forming apparatus may be an image forming apparatus other than the MFP such as a printer-only machine insofar as the image forming apparatus executes the variable printing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable recording medium storing a printing program for execution on a computer, the computer causing an image forming apparatus to perform a print job based on variable print data including reuse data and variable data, the reuse data being a common part of a plurality of printed matters, the variable data being a variable part of the respective printed matters, the printing program causing the computer to function as an available capacity determining circuit that i) determines an available capacity for storing the print job in a main storage device of the image forming apparatus, and ii) determines, if the image forming apparatus includes an auxiliary storage device, the available capacity for storing the print job in the auxiliary storage device; and a print data transmitting circuit that transmits print data to the image forming apparatus, the print data being adapted to the available capacity determined by the available capacity determining circuit; wherein:

(i) the available capacity determining circuit determines whether the available capacity of the main storage device is equal to or more than the image forming apparatus' variable printing capacity as a capacity at which the print job is executable by the image forming apparatus with the image forming apparatus storing raster image processor (RIP)-processed reuse data;

(ii) the print data transmitting circuit transmits, if the available capacity of the main storage device is equal to or more than the variable printing capacity, variable print data to which is added an instruction to store the RIP-processed reuse data in the main storage device and to reuse the RIP-processed reuse data stored in the main storage device;

(iii) the available capacity determining circuit determines, if the available capacity of the main storage device is less than the variable printing capacity, whether the image forming apparatus includes the auxiliary storage device;

(iv) the available capacity determining circuit determines, if the image forming apparatus includes the auxiliary storage device and the available capacity of the main storage device is less than the variable printing capacity, whether the available capacity of the auxiliary storage device is equal to or more than the variable printing capacity;

(v) the print data transmitting circuit transmits, if the available capacity of the auxiliary storage device is equal to or more than the variable printing capacity, variable print data to which is added an instruction to store the RIP-processed reuse data in the auxiliary storage device and to reuse the RIP-processed reuse data stored in the auxiliary storage device;

(vi) the available capacity determining circuit determines, if one of (A) the image forming apparatus does not include the auxiliary storage device and (B) the available capacity of the auxiliary storage device is less than the variable printing capacity, whether the available capacity of the main storage device is equal to or more than the image forming apparatus' reuse printing capacity as a capacity at which the print job is executable by the image forming apparatus with the image forming apparatus storing pre-RIP-processed reuse data;

(vii) the print data transmitting circuit transmits, if the available capacity of the main storage device is equal to or more than the reuse printing capacity, variable print data to which is added an instruction to store the pre-RIP-processed reuse data in the main storage device and to reuse the pre-RIP-processed reuse data stored in the main storage device; and (viii) the print data transmitting circuit converts, if the available capacity of the main storage device is less than the reuse printing capacity, the variable print data into print data without the reuse data and transmits the converted print data to the image forming apparatus; and furthermore wherein the pre-RIP-processed reuse data is of smaller size than that of reuse bitmap data being the reuse data RIP-processed.

2. The recording medium according to claim 1, wherein the available capacity determining circuit obtains from the image forming apparatus the available capacity of the main storage device and, if the image forming apparatus includes an auxiliary storage device, obtains the available capacity of the auxiliary storage device.

3. The recording medium according to claim 1, wherein the reuse printing capacity is smaller than the variable printing capacity.

* * * * *